（12) United States Patent
Guo et al.

(10) Patent No.: US 10,326,835 B1
(45) Date of Patent: Jun. 18, 2019

(54) GLOBAL DATA MOVEMENT IN CLOUD COMPUTING ENVIRONMENT

(71) Applicant: EMC IP Holding Company LLC, Hopkinton, MA (US)

(72) Inventors: Xiaoyan Guo, Beijing (CN); Yu Cao, Beijing (CN); Sanping Li, Shanghai (CN); Simon Tao, Shanghai (CN); Zhe Dong, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 334 days.

(21) Appl. No.: 15/262,709

(22) Filed: Sep. 12, 2016

(51) Int. Cl.
*H04L 29/08* (2006.01)

(52) U.S. Cl.
CPC ........ *H04L 67/1078* (2013.01); *H04L 67/108* (2013.01); *H04L 67/1097* (2013.01)

(58) Field of Classification Search
CPC ............... H04L 67/1078; H04L 67/108; H04L 67/1097
See application file for complete search history.

(56) References Cited

U.S. PATENT DOCUMENTS

| | | | | |
|---|---|---|---|---|
| 9,270,750 | B1* | 2/2016 | Biberman | H04L 67/104 |
| 9,544,351 | B1* | 1/2017 | Lee | H04L 65/608 |
| 2004/0064511 | A1* | 4/2004 | Abdel-Aziz | H04L 51/066 |
| | | | | 709/206 |
| 2005/0203851 | A1* | 9/2005 | King | G06F 17/30067 |
| | | | | 705/51 |
| 2007/0083725 | A1* | 4/2007 | Kasiolas | G06F 3/0605 |
| | | | | 711/165 |
| 2008/0005114 | A1* | 1/2008 | Li | G06F 17/30209 |
| 2008/0133535 | A1* | 6/2008 | Fischer | H04L 67/104 |
| 2009/0288127 | A1* | 11/2009 | Corson | H04H 20/08 |
| | | | | 725/110 |
| 2011/0179328 | A1* | 7/2011 | Souza | H04N 21/4788 |
| | | | | 714/748 |
| 2013/0054536 | A1* | 2/2013 | Sengupta | G06F 17/30289 |
| | | | | 707/654 |
| 2013/0067091 | A1* | 3/2013 | Kern | H04L 63/0407 |
| | | | | 709/226 |
| 2014/0040353 | A1* | 2/2014 | Sebastian | H04L 67/06 |
| | | | | 709/203 |
| 2014/0115037 | A1* | 4/2014 | Liu | H04L 65/1016 |
| | | | | 709/203 |
| 2014/0143339 | A1* | 5/2014 | Huang | H04L 67/16 |
| | | | | 709/204 |
| 2014/0280753 | A1* | 9/2014 | Kinsman | H04L 67/1072 |
| | | | | 709/219 |
| 2015/0088586 | A1* | 3/2015 | Pavlas | G06F 9/45558 |
| | | | | 705/7.25 |

(Continued)

*Primary Examiner* — Brian J. Gillis
*Assistant Examiner* — Javier O Guzman
(74) *Attorney, Agent, or Firm* — Ryan, Mason & Lewis, LLP

(57) ABSTRACT

A data movement method includes enabling a given data center operatively coupled to one or more other data centers via a communication network to move data between itself and the one or more other data centers in accordance with a peer-to-peer protocol. The given data center and the one or more other data centers thereby form a peer-to-peer network. At least a portion of the given data center and the one or more other data centers are implemented on a cloud computing platform.

21 Claims, 7 Drawing Sheets

(56) References Cited

U.S. PATENT DOCUMENTS

| | | | |
|---|---|---|---|
| 2015/0127607 A1* | 5/2015 | Savage | G06F 17/30194 707/610 |
| 2016/0248698 A1* | 8/2016 | Sahu | G06F 8/61 |
| 2016/0321291 A1* | 11/2016 | Malhotra | G06F 16/182 |
| 2017/0111434 A1* | 4/2017 | Allen | H04L 67/06 |
| 2017/0295226 A1* | 10/2017 | Basta | H04L 67/1042 |

* cited by examiner

US 10,326,835 B1

GLOBAL DATA MOVEMENT IN CLOUD COMPUTING ENVIRONMENT

FIELD

The field relates generally to data movement, and more particularly to data movement in cloud computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Such cloud computing platforms may also be referred to as "third platforms," which refers to the third model of computing platforms that, among other features, supports interdependencies between mobile computing, social media, cloud computing, and information/analytics (big data).

Cloud-based data centers are deployed and managed by cloud service providers, who provide a computing environment for customers (tenants) to run their application programs (e.g. business applications or otherwise). Such cloud computing platforms may be implemented at least in part utilizing one or more virtual compute elements such as one or more virtual machines or one or more containers.

The concepts of cloud computing and third platform have been quickly adopted worldwide, from major content providers and solution providers to small business enterprises. Many entities have moved their internal computing infrastructure or services to a third platform implementation. Such services are supported by large data centers which can be globally distributed.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, illustrative embodiments provide improved data movement in cloud computing environments. It is realized herein that an improved data movement mechanism for geo-distributed data centers is motivated by one or more factors, for example: first, the volume of data to be distributed is extremely large; second, the network connection among these data centers is of limited bandwidth and unstable; and third, the data to be distributed are of diverse types, including files, data blocks and objects. As used herein, the term "geo-distributed" refers to data centers distributed worldwide or globally.

Figure 1:
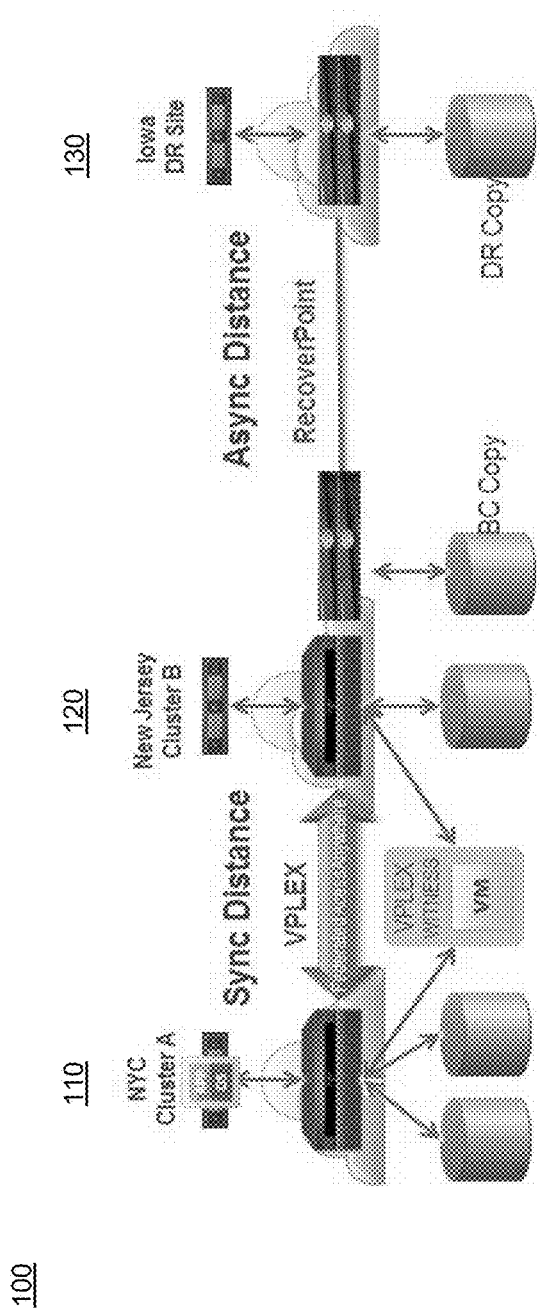
FIG. 1 illustrates an example of data synchronization between data centers with which one or more embodiments of the invention may be implemented.

Existing solutions are unable to well address this data movement problem on the third platform. Symmetrix Remote Data Facility (SRDF) is an enterprise storage remote replication product available from EMC Corporation (Hopkinton, Mass.) which can mirror and replicate data anywhere, at all times, with little performance impact. VPLEX and RecoverPoint are state-of-the-art products, also available from EMC Corporation, based on the SRDF technique designed to synchronize data between data centers. System 100 in FIG. 1 is an example of the VPLEX and RecoverPoint environment with two data centers (NYC cluster A denoted as 110, and New Jersey cluster B denoted as 120) and a disaster recovery (DR) site 130 that provides data protection/backup/recovery for the data of the two data centers 110 and 120 (as DR copy). Note that BC copy refers to business continuity copy which contains the data that allows mission critical processes to continue in the event of a disaster (i.e., an event that causes data loss).

Figure 2:
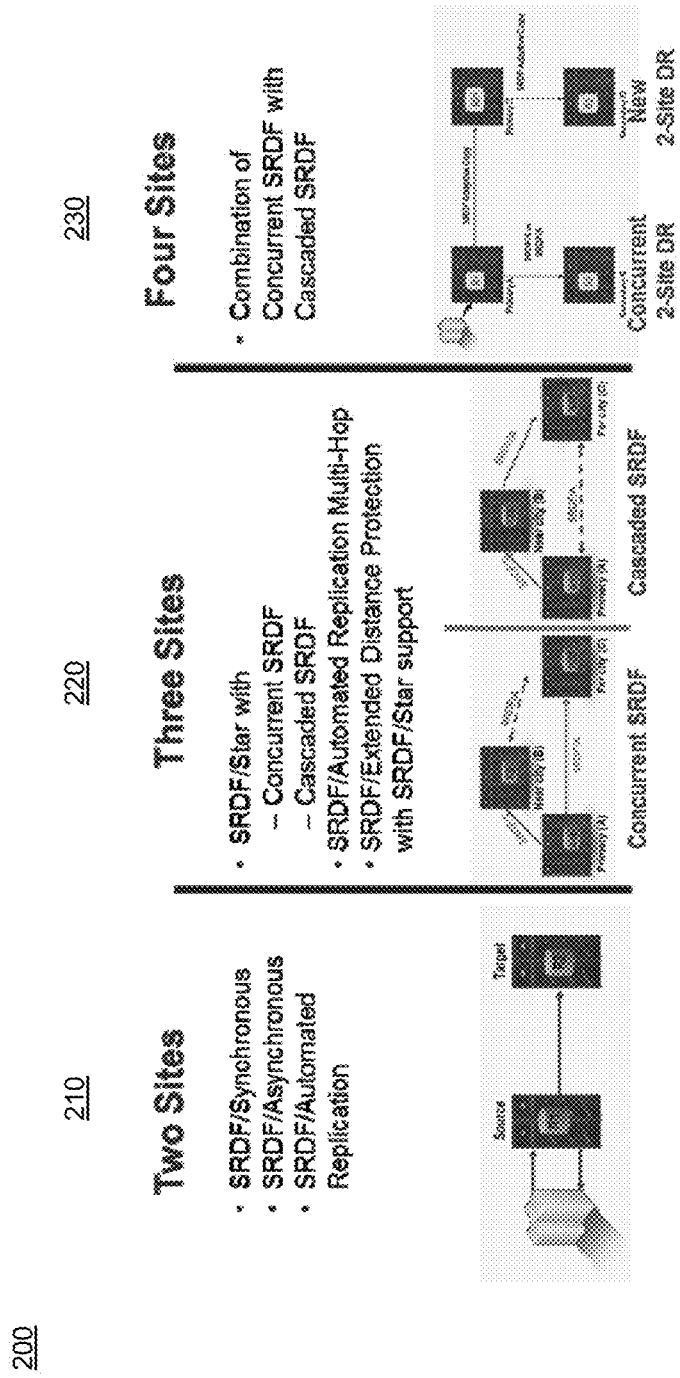
FIG. 2 illustrates an example of multi-site replication configuration and topology with which one or more embodiments of the invention may be implemented.

However, SRDF directly supports data movements only between two data centers. Hence, it requires exactly 1:1:1 mapping topology when handling multiple data centers as shown in the site arrangement examples 200 in FIG. 2, i.e., two site arrangement 210, three site arrangement 220, and four site arrangement 230. When there are five or more data centers, the mapping topology becomes extremely complex and the effectiveness of data distribution cannot be sufficiently guaranteed. Furthermore, data distribution is at most limited to the national-level with these solutions, which are unable to guarantee service level agreements (SLA) when the clusters are across distant countries and/or continents. Hence, in practice these solutions cannot be deployed for worldwide distributed data centers.

Figure 3:
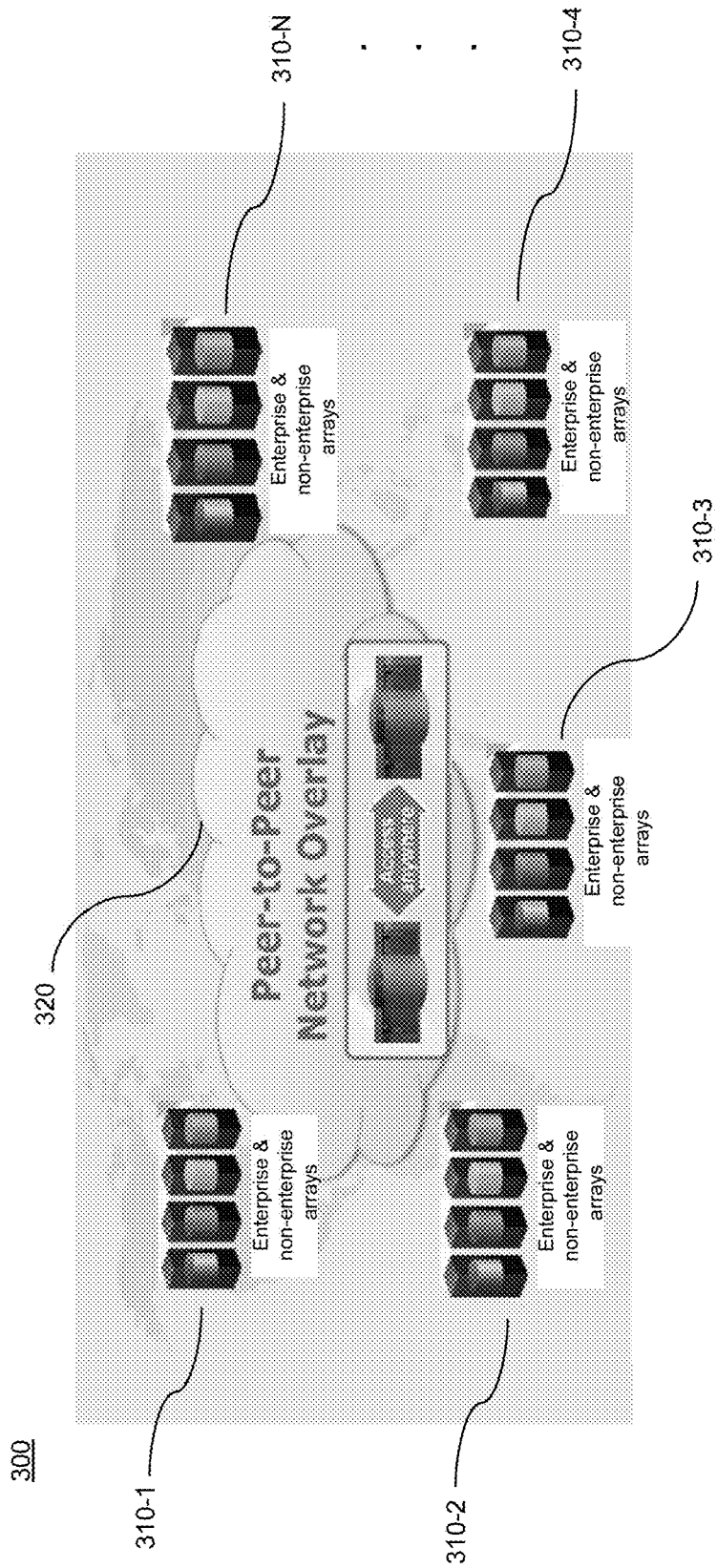
FIG. 3 illustrates an example of peer-to-peer connected geo-distributed data centers, according to an embodiment of the invention.

Illustrative embodiments of the invention provide mechanisms to enable peer-to-peer (P2P) data movement within and atop commercial storage and data centers as shown in the geo-distributed data center platform 300 of FIG. 3. As shown, platform 300 comprises a plurality of data centers 310-1, 310-2, 310-3, 310-4, . . . 310-N (note that, as shown in this example, each data center may comprise a mix of enterprise and non-enterprise arrays) that are coupled via a network 320 with a peer-to-peer network overlay. With the proposed P2P approach, geo-distributed data centers are configured to enable transparent sharing and relocating of data worldwide. The detailed description below will describe the proposed P2P data movement mechanism and workflow for data movement, approaches about how to integrate the P2P mechanism with existing data storage and data centers, mechanisms for realizing dynamic and intelligent data relocation, and approaches for supporting diverse data types.

Before describing illustrative embodiments, some problems with existing solutions will first be described. In general, illustrative embodiments address the problem of reliable and fast data movement among geo-distributed data centers, which cannot be sufficiently solved by existing solutions.

Most existing data center data distribution tools support data movement between two data centers. As a result, it will require a 1:1:1 mapping topology when moving data among multiple data centers. Moreover, the topology configuration becomes extremely complex if there are five or more data centers.

It is therefore realized herein that data centers implemented on cloud computing platforms such as, for example, the third platform, would benefit from a flexible data movement mechanism where the topology of network connection between data centers is self-adapting, so that a data center can dynamically join or leave the network, with no requirement of complex pre-configuration or cumbersome runtime coordination.

Existing data movement solutions work typically only for data centers whose in-between distances are at a metro level (within confines of a city) or national level (within confines of a country or closely located or collocated countries). As such, with unreliable and low-bandwidth network connectivity, they cannot be utilized for the reliable and efficient data movement at the global (worldwide) level.

The existing data movement and synchronization tools for data centers usually can only support block-based storage. The data synchronization tools for upper applications built on data centers are usually file-based.

However, there are typically three types of data storage: block-based, file-based and object-based. In a real production environment, data centers are usually heterogeneous with different types of storage devices. All of these types of storage devices have the requirement to move data among them. Therefore, it is realized herein that an extensible data movement mechanism to support different storage types is highly desirable. However, the existing tools lack the functionality and mechanisms to move data among different types of storage devices.

Nowadays, it has become common for servers across different data centers to collaborate on extremely large-scale data computing tasks. It is realized herein that such collaborative computing could be achieved with concepts including P2P-based computing and data aggregation, which unfortunately are not supported by existing data movement solutions.

Illustrative embodiments overcome the above and other drawbacks associated with existing data movement approaches. More particularly, illustrative embodiments provide a P2P data movement mechanism designed to move and synchronize data among data centers. This mechanism can be utilized to construct a global virtual data center system to transparently share and relocate data worldwide, e.g., platform 300 as shown in FIG. 3.

In one or more illustrative embodiments, a P2P network is created when two or more nodes are connected and share resources without going through a separate server node. P2P is able to reliably and quickly transfer data among all peer nodes. Compared to the subsequent data movement cost, the overall cost of building such a network is trivial.

Figure 4:
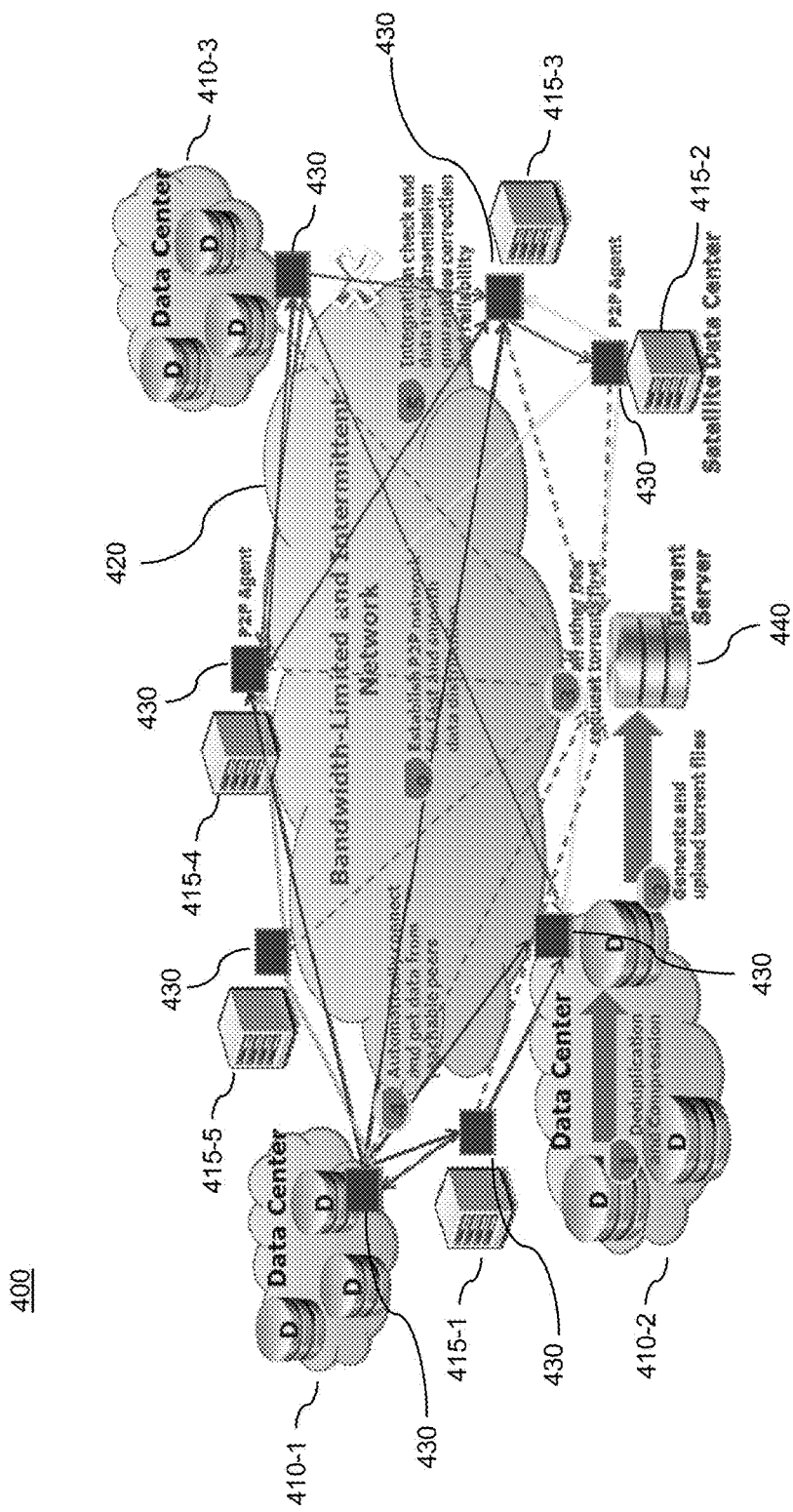
FIG. 4 illustrates a data movement workflow in a computing platform with geo-distributed data centers, according to an embodiment of the invention.

In platform 300 in FIG. 3, there are different data centers (310-1, . . . , 310-N) located at different locations worldwide (as illustrated by the global map across which the P2P network overlay is formed) which need to distribute or move data among each other. FIG. 4 illustrates components and overall workflow of the P2P data movement mechanism according to an illustrative embodiment. Platform 400 shown in FIG. 4 may be considered a more detailed view of platform 300 shown in FIG. 3.

As shown in FIG. 4, platform 400 comprises a plurality of main data centers 410-1, 410-2, and 410-3 and a plurality of satellite data centers 415-1, 415-2, 415-3, 415-4, and 415-5 (these data centers are satellite with respect to one or more of the main data centers). The data centers (410 and 415, collectively) are globally distributed across a network 420 to form a P2P network. Again, as used herein, the term "peer-to-peer" illustratively refers to a computing network in which each computing node (data center, in this case) is configured to be able to act as a server to each other computing node in the network, thus allowing for shared access to data among the computing nodes without the need for a centralized server. Network 420 may be considered an extended P2P network in which all the data centers enable fast and reliable data distribution under bandwidth-limited and intermittent network conditions.

Each data center hosts and runs a P2P agent 430 that, among other functions, serves to establish the P2P network with other data centers. The P2P agent 430 is responsible for communicating with other P2P agents 430 and a torrent server 440. Further, the P2P agent 430 is responsible for sending and receiving data between its host data center and remote data centers. Torrent server 440 is a centralized server set up to host torrent files and exchange metadata among all the data centers (410 and 415). In this illustrative embodiment, a torrent file contains the metadata of all data centers and metadata to be transferred, such as the addresses of data centers, description and checksum of each data segmentation, etc. Thus, a data file, block or object may be segmented and data segments distributively stored across multiple data centers. When one data center wishes to obtain the complete data file, block or object, it obtains the segments of the file, block or object that it does not currently possess from one or more other data centers in the P2P network 420. This protocol will be further described below in the context of the enumerated steps outlined in FIG. 4.

To build a P2P-connected data center network, for example, first the global centralized torrent server 440 is set up. Then, P2P agents 430 are set up for each data center. In illustrative embodiments, a P2P agent 430 can be a pluggable physical appliance, or a software process running within the storage system. A P2P network is thus built among all data centers (410 and 415). As such, each data center runs an extended P2P application (the P2P agent), which exchanges and moves data according to a P2P protocol.

With continued reference to FIG. 4, a detailed workflow of the P2P data movement mechanism is elaborated below (note that the numbered steps below correspond to the circled numbers shown in FIG. 4):

0. First, the P2P network 420 is established as described above.

1. When a given data center (410 or 415) would like to move data to other data centers (410 and/or 415), the P2P agent 430 of the data center first de-duplicates and compresses the data to reduce the data volume.

2. The P2P agent 430 of the given data center generates the torrent file for this data:
   a. First, segment the data into equal-length pieces;
   b. Second, hash each data piece;
   c. Third, write an index of each piece and its hash value to the torrent file.

3. The P2P agent 430 of the given data center uses a reliable network protocol (such as Transmission Control Protocol or TCP) to distribute the torrent file to all other data centers. The torrent file is relatively small (typically under 10 Megabytes or MB), and hence this distribution is fast.
   a. First, the P2P agent 430 uploads the torrent file to the centralized torrent server 440;
   b. Second, all other data centers request the torrent server 440 to obtain this torrent file.

4. After obtaining the torrent file, each peer data center retrieves pieces of the data from the P2P network (all reachable data centers), and then hashes each piece of data and compares the hash code with that in the torrent file. If the hash codes are equal (data is correct), the data center saves the data piece. Otherwise, the data center re-retrieves this piece.

5. In an intermittent network, the connection between two data center peers can be lost at any time (illustrated by the "X" between the P2P agents of data center 410-3 and 415-3). So each data center peer will connect and maintain connections with all reachable data center peers, and pull data from them simultaneously. If any connection is lost, the data center will try to connect the other available data center peers. Advantageously, any lost connection will only have a small effect on the total data distribution procedure. This allows the data to be spread extremely quickly, and hence reduces the total data movement time.

After getting all pieces of data, the P2P agent of each peer data center is responsible to re-compose the original data according to the torrent file. After that, the data movement procedure is successfully completed.

Currently, existing P2P protocols can only support transfer of files among peers. Typically, as mentioned above, there are three types of storage devices contained in data centers based on the data organization, i.e., file-based, object-based and block-based. Therefore, illustrative embodiments extend existing P2P protocols to support all three kinds of storage devices.

P2P data movement requires a method to segment the data and re-compose the segmented data. For different types of storage, the data is organized in different formats. As such, illustrative embodiments define different rules and mechanisms to segment and re-compose data for different types of storage devices.

File-based: the existing P2P protocols and applications are all file-based, and thus they can handle the file-based storage well. In this file-based storage, the protocol segments each file into equal-length pieces, and treats each piece as the basic unit of data transferring. In the illustrative embodiment, after obtaining all the pieces, the P2P agent re-composes the original file by concatenating these pieces sequentially.

Block-based: in this embodiment, each block is treated as the unit piece to transfer. After obtaining each block, the P2P agent simply writes the content of this block back to its own block, after doing error-checking.

Object-based: in this embodiment, each object is treated as a unit piece to transfer and re-compose. For a large object, it can be equally segmented into smaller pieces and re-composed together in the remote data center.

Illustrative embodiments further provide a dynamic and intelligent data placement and relocation mechanism. In geo-distributed data centers, data is first replicated or partitioned, and then placed on multiple clusters (data centers) geographically. One key yet challenging problem is how to optimally place these data among these storage clusters in order to achieve best performance, i.e., high availability (HA), SLA, etc. On the other hand, the data placement should not be static and permanent; instead it should be dynamically changed along with changes to the workload, data center topologies and user requirements. Hence, another problem is how to automatically relocate the data to adapt to the changes of the data center environment.

In traditional data centers, the mechanisms of data placement and data relocation are typically determined and configured by the system administrators. It cannot be easily changed at runtime. However, for P2P-connected data centers according to illustrative embodiments, the flexible architecture and topology makes it extremely easy to conduct dynamic and intelligent data placement and relocation.

In one illustrative embodiment, a cost-based approach is used to derive a data placement and relocation scheme based on the P2P data movement mechanism.

There are many considerations when placing and relocating the data. For example, these considerations include, but are not limited to: storage device capacity; HA; access performance; data locality; and fault-tolerance.

When deriving a data placement scheme, illustrative embodiments compute the cost score for each consideration item listed above. After that, an overall cost score is computed by adding all the scores together. A smaller overall cost score indicates the data placement scheme is better. With this cost-based model, the optimal data placement scheme can be chosen and applied from various candidate placement schemes.

The optimal data placement scheme is placed on the torrent server 440 in order to distribute it to all the data centers (410 and 415). The data centers get this torrent file (i.e., data placement scheme), and then pull all the data belonging to them separately. If the data placement scheme is changed, the torrent file containing the placement scheme is changed. In this way, the data centers then adjust and exchange their data accordingly.

Figure 5:
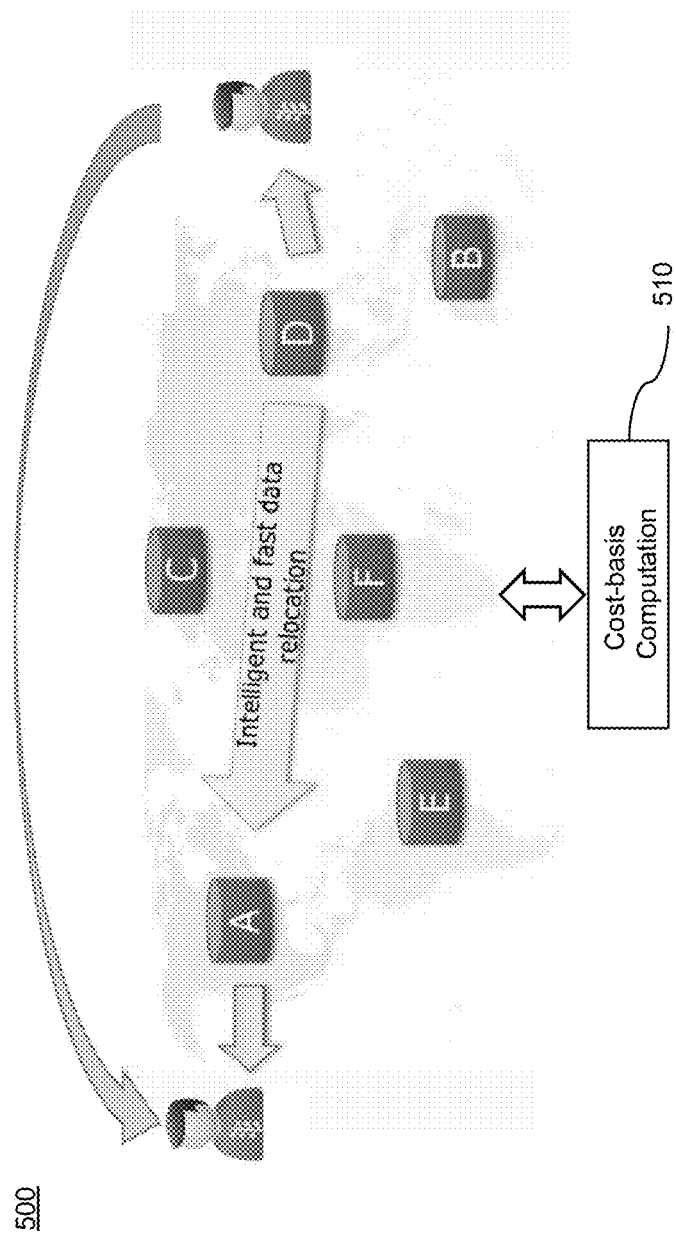
FIG. 5 illustrates intelligent data relocation, according to an embodiment of the invention.

To illustrate the idea, we give an example of intelligent data relocation. FIG. 5 shows a practical problem of data relocation with respect to a P2P network 500 comprising geo-distributed data centers A, B, C, D, E, and F (it is to be appreciated that components such as P2P agents, torrent server, etc. are not shown in FIG. 5 for ease of illustration). Assume an individual is based in China, and hence the best way to access the individual's data is to place the individual's data on the data center D located in China. When the individual moves to the US, the fastest data center to the individual is located in the US, i.e., data center A. Hence, if the individual's data is moved from China to the US, the individual will get better data services. This example case illustrates the problem of how to intelligently relocate data based on user requirements and workloads.

With the cost-based data relocation mechanism according to illustrative embodiments, workload changes are periodically computed and detected. When workloads change, the above-described algorithm to compute the optimal data relocation scheme is run in cost-basis computation module 510 shown in FIG. 5. Note that module 510 can be implemented as a standalone module, as part of one or more of the data centers or P2P agents, as part of the torrent server, or as some combinations thereof. In this example, the considerations include: data access latency for each data center; the data movement cost between data centers; and data center storage capacity. After going over all possible relocation candidates, one candidate that has minimum cost to apply is chosen.

Still further, illustrative embodiments provide collaborative P2P cloud-assisted computing and data aggregation. The traditional data centers lack a flexible communication and data exchange mechanism. As such, they are not able to conduct collaborative work, such as distributed data aggregation and computing.

However, with the flexible P2P data movement mechanism according to illustrative embodiments, collaborative peer-to-peer computing and data aggregation are enabled among geo-distributed data centers. The data centers can utilize the mechanism to exchange data messages and control messages, and then collaboration becomes feasible.

Figure 6:
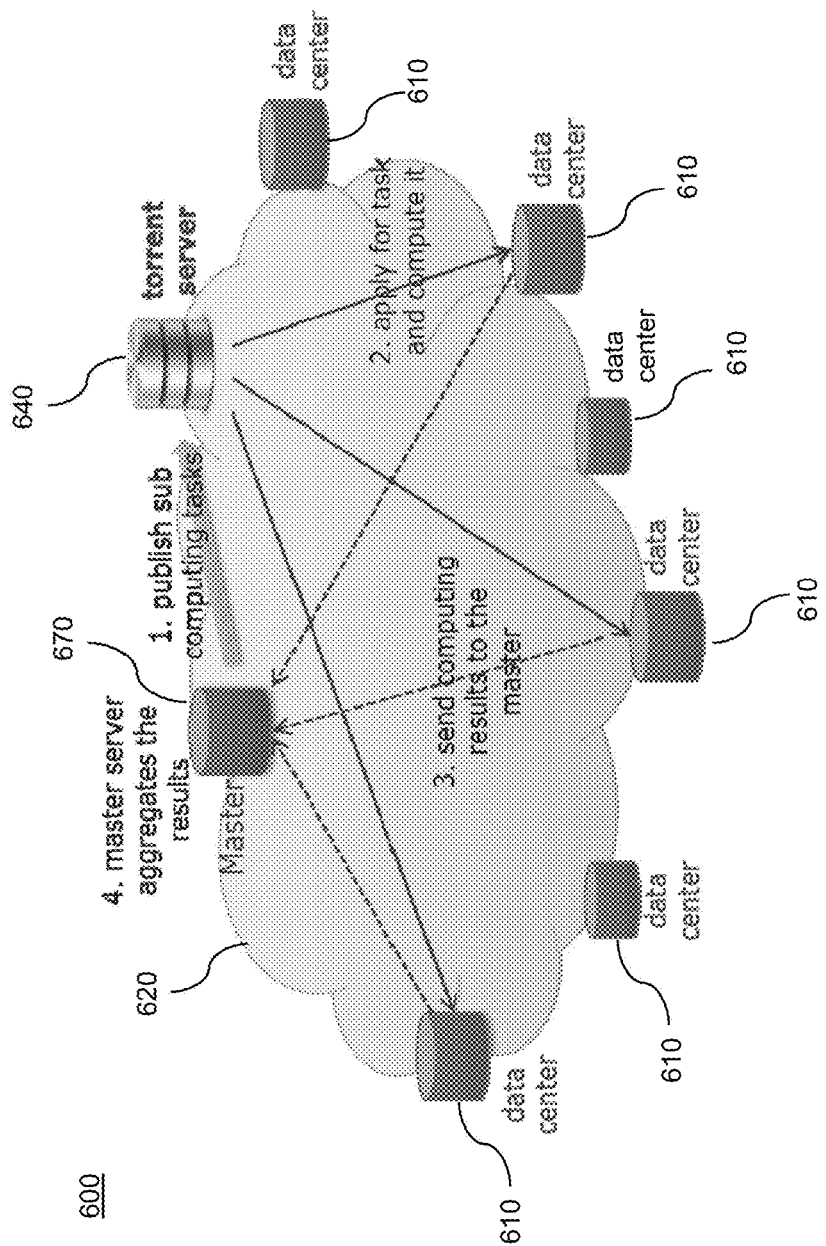
FIG. 6 illustrates a workflow of a peer-to-peer cloud-assisted computing platform, according to an embodiment of the invention.

Two application scenarios for data center collaboration that can be implemented with the P2P data movement mechanism are described in the context of P2P network 600 of FIG. 6. As shown, a plurality of data centers 610 form the P2P network 620 (it is to be appreciated that components such as P2P agents are not shown in FIG. 6 for ease of illustration). Also shown in network 620 are a torrent server 640 and a master server 670.

P2P cloud-assisted computing: in a scenario such as data encryption and scientific computing, one data center becomes the master, and the master data center (master server 670) allocates distributed tasks to other reachable data centers 610. The tasks are published to the torrent server 640 (step 1). The data center that has computing capacity claims and conducts the task (step 2). This tasks are computed by multiple data centers 610. After finishing the task, each data center sends its results to the master data center 670 (step 3). The master data center 670 aggregates all the results (step 4) and outputs the final computing result. In this way, the total computing efficiency and data center utilization is greatly improved.

Data aggregation: in this scenario, there are small satellite data centers (610) located at different places and serving different users. In addition, there can be a central data center (670) that holds all the complete data. The satellite data centers (610) periodically send the data to the central data center 670 for analytics or archiving. In this scenario, the data aggregation control and data movement are also accomplished by employing the P2P data movement mechanism.

Figure 7:
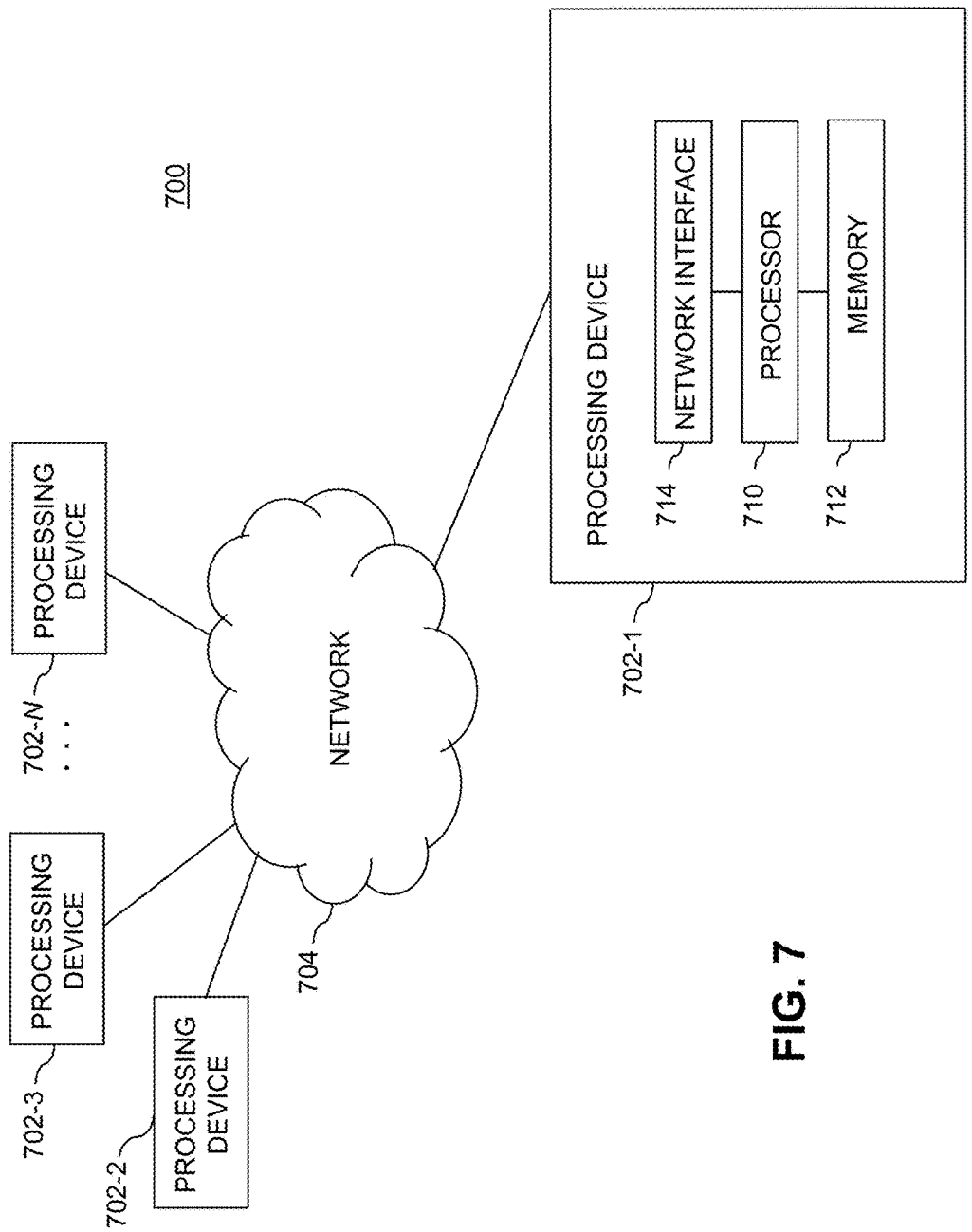
FIG. 7 illustrates a processing platform used to implement data movement across geo-distributed data centers, according to an embodiment of the invention.

FIG. 7 illustrates a processing platform used to implement a data movement architecture, according to an embodiment of the invention.

As an example of a processing platform on which a computing environment such as a cloud computing platform with data movement functionalities (e.g., FIGS. 1-6) can be implemented is processing platform 700 shown in FIG. 7. It is to be appreciated that processing platform 700 may implement the functionalities described herein. For example, the various architectures and methodologies of FIGS. 1-6 can be implemented in processing platform 700.

The processing platform 700 in this embodiment comprises a plurality of processing devices, denoted 702-1, 702-2, 702-3, . . . 702-N, which communicate with one another over a network 704. For example, one or more of the processing devices 702-1, 702-2, 702-3, . . . 702-N can be used to implement a data center with P2P agent, torrent server, etc. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

As described herein, illustrative embodiments provide techniques for improved data movement in cloud computing environments. For example, in one illustrative embodiment, a data movement method comprises enabling a given data center operatively coupled to one or more other data centers via a communication network to move data between itself and the one or more other data centers in accordance with a peer-to-peer protocol. The given data center and the one or more other data centers thereby form a peer-to-peer network. At least a portion of the given data center and the one or more other data centers are implemented on a cloud computing platform.

Advantageously, illustrative embodiments provide data movement techniques for a cloud computing platform which account for the characteristics of geo-distributed data centers by implementing a self-adapting, fast peer-to-peer network.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
enabling a given data center operatively coupled to one or more other data centers via a communication network to move data between the given data center and the one or more other data centers in accordance with a peer-to-peer protocol, wherein the given data center and the one or more other data centers thereby form a peer-to-peer network, the enabling comprising the given data center executing a peer-to-peer agent, the peer-to-peer agent of the given data center obtaining a metadata file from a metadata file server for data that it seeks from one or more of the other data centers in the peer-to-peer network, the peer-to-peer agent of the given data center retrieving the data it seeks from one or more of the other data centers in the peer-to-peer network based on the metadata in the obtained metadata file;
wherein the peer-to-peer agent of the given data center hashes each unit piece of data the peer-to-peer agent receives to generate a hash value, and compares the hash value with the obtained metadata file; and
wherein at least a portion of the given data center and the one or more other data centers are implemented on a cloud computing platform.

2. The method of claim 1, wherein at least a portion of the given data center and the one or more other data centers are globally distributed with respect to one another.

3. The method of claim 1, wherein the peer-to-peer agent of the given data center generates a metadata file for the data to be moved.

4. The method of claim 3, wherein the peer-to-peer agent of the given data center segments the data to be moved into unit pieces of data.

5. The method of claim 4, wherein the peer-to-peer agent of the given data center writes an index of each unit piece and its hash value to the generated metadata file.

6. The method of claim 5, wherein the peer-to-peer agent of the given data center sends the generated metadata file to the metadata file server such that each of the one or more other data centers are able to obtain the generated metadata file when they seek to obtain the data being moved.

7. The method of claim 1, wherein the peer-to-peer agent of the given data center stores the unit piece of data at the given data center when the comparison yields a match of the computed hash value and the hash value in the obtained metadata file.

8. The method of claim 7, wherein the peer-to-peer agent of the given data center attempts to re-retrieve the unit piece of data from one or more of the other data centers when the comparison does not yield a match of the computed hash value and the hash value in the obtained metadata file.

9. The method of claim 8, wherein the peer-to-peer agent of the given data center combines multiple unit pieces of data based on the obtained metadata file to re-compose the original data.

10. The method of claim 1, wherein the data to be moved comprises one of a data file, a data block, and a data object.

11. The method of claim 1, wherein unit pieces of data that comprise the original data are placed at or relocated to the given data center and the one or more other data centers in the peer-to-peer network based on a cost-basis computation.

12. The method of claim 11, wherein the cost-basis computation comprises computing respective cost values corresponding to considerations comprising one or more of: storage device capacity; high availability; access performance; data locality; and fault tolerance.

13. The method of claim 1, wherein the given data center and the one or more other data centers in the peer-to-peer network are enabled to share data computation tasks and provide data computation results to a master server for aggregation.

14. A system comprising:
at least one processor, coupled to a memory, and configured to:
enable a given data center operatively coupled to one or more other data centers via a communication network to move data between the given data center and the one or more other data centers in accordance with a peer-to-peer protocol, wherein the given data center and the one or more other data centers thereby forming a peer-to-peer network, the enabling comprising the given data center executing a peer-to-peer agent, the peer-to-peer agent of the given data center configured to obtain a metadata file from a metadata file server for data that it seeks from one or more of the other data centers in the peer-to-peer network, the peer-to-peer agent of the given data center configured to retrieve the data it seeks from one or more of the other data centers in the peer-to-peer network based on the metadata in the obtained metadata file;
wherein the peer-to-peer agent of the given data center hashes each unit piece of data the peer-to-peer agent receives to generate a hash value, and compares the hash value with the obtained metadata file; and wherein at least a portion of the given data center and the one or more other data centers are implemented on a cloud computing platform.

15. An article of manufacture comprising a processor-readable storage medium having encoded therein executable code of one or more software programs, wherein the one or more software programs when executed by at least one processing device implement the steps of:

enabling a given data center operatively coupled to one or more other data centers via a communication network to move data between the given data center and the one or more other data centers in accordance with a peer-to-peer protocol, wherein the given data center and the one or more other data centers thereby forming a peer-to-peer network, the enabling comprising the given data center executing a peer-to-peer agent, the peer-to-peer agent of the given data center obtaining a metadata file from a metadata file server for data that it seeks from one or more of the other data centers in the peer-to-peer network, the peer-to-peer agent of the given data center retrieving the data it seeks from one or more of the other data centers in the peer-to-peer network based on the metadata in the obtained metadata file;

wherein the peer-to-peer agent of the given data center hashes each unit piece of data the peer-to-peer agent receives to generate a hash value, and compares the hash value with the obtained metadata file; and wherein at least a portion of the given data center and the one or more other data centers are implemented on a cloud computing platform.

16. The system of claim 14, wherein at least a portion of the given data center and the one or more other data centers are globally distributed with respect to one another;

wherein the peer-to-peer agent of the given data center generates a metadata file for the data to be moved;

wherein the peer-to-peer agent of the given data center segments the data to be moved into unit pieces of data;

wherein the peer-to-peer agent of the given data center writes an index of each unit piece and its hash value to the generated metadata file; and wherein the peer-to-peer agent of the given data center sends the generated metadata file to the metadata file server such that each of the one or more other data centers are able to obtain the generated metadata file when they seek to obtain the data being moved.

17. The system of claim 14, wherein the peer-to-peer agent of the given data center stores the unit piece of data at the given data center when the comparison yields a match of the computed hash value and the hash value in the obtained metadata file;

wherein the peer-to-peer agent of the given data center attempts to re-retrieve the unit piece of data from one or more of the other data centers when the comparison does not yield a match of the computed hash value and the hash value in the obtained metadata file; and wherein the peer-to-peer agent of the given data center combines multiple unit pieces of data based on the obtained metadata file to re-compose the original data.

18. The article of manufacture of claim 15, wherein the peer-to-peer agent of the given data center stores the unit piece of data at the given data center when the comparison yields a match of the computed hash value and the hash value in the obtained metadata file;

wherein the peer-to-peer agent of the given data center attempts to re-retrieve the unit piece of data from one or more of the other data centers when the comparison does not yield a match of the computed hash value and the hash value in the obtained metadata file; and wherein the peer-to-peer agent of the given data center combines multiple unit pieces of data based on the obtained metadata file to re-compose the original data.

19. The system of claim 14, wherein the data to be moved comprises one of a data file, a data block, and a data object.

20. The system of claim 14, wherein unit pieces of data that comprise original data are placed at or relocated to the given data center and the one or more other data centers in the peer-to-peer network based on a cost-basis computation.

21. The system of claim 20, wherein the cost-basis computation comprises computing respective cost values corresponding to considerations comprising one or more of: storage device capacity; high availability; access performance; data locality; and fault tolerance.

* * * * *